US010282236B2

(12) United States Patent
Shum et al.

(10) Patent No.: US 10,282,236 B2
(45) Date of Patent: *May 7, 2019

(54) DYNAMIC LOAD BALANCING FOR DATA ALLOCATION TO SERVERS

(71) Applicant: International Business Machines Corporation, Armonk, NY (US)

(72) Inventors: Mi W. Shum, San Jose, CA (US); DongJie Wei, Beijing (CN); Samuel H. K. Wong, San Jose, CA (US); Xin Ying Yang, Beijing (CN); Xiang Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 343 days.

This patent is subject to a terminal disclaimer.

(21) Appl. No.: 14/692,098

(22) Filed: Apr. 21, 2015

(65) Prior Publication Data

US 2016/0314023 A1 Oct. 27, 2016

(51) Int. Cl.
G06F 15/16 (2006.01)
G06F 9/50 (2006.01)
H04L 29/08 (2006.01)
H04L 12/803 (2013.01)

(52) U.S. Cl.
CPC .......... G06F 9/5083 (2013.01); H04L 47/125 (2013.01); H04L 67/1008 (2013.01); H04L 67/1012 (2013.01); H04L 67/1031 (2013.01)

(58) Field of Classification Search
CPC . G06F 9/5083; H04L 67/1031; H04L 47/125; H04L 67/1008; H04L 67/1012
See application file for complete search history.

(56) References Cited

U.S. PATENT DOCUMENTS

| 6,678,813 | B1* | 1/2004 | Le | G06F 5/065 |
| | | | | 710/56 |
| 8,296,434 | B1 | 10/2012 | Miller et al. | |
| 8,645,454 | B2 | 2/2014 | Mathew | |
| 2012/0271943 | A1 | 10/2012 | Chen | |
| 2012/0278587 | A1* | 11/2012 | Caufield | G06F 9/505 |
| | | | | 711/173 |
| 2014/0304320 | A1* | 10/2014 | Taneja | H04L 69/16 |
| | | | | 709/203 |
| 2015/0178137 | A1 | 6/2015 | Gordon et al. | |
| 2015/0180719 | A1* | 6/2015 | Wu | H04L 41/0896 |
| | | | | 709/224 |

OTHER PUBLICATIONS

U.S. Appl. No. 15/018,916, filed Feb. 9, 2016, Entitled "Dynamic Load Balancing for Data Allocation to Servers".

(Continued)

*Primary Examiner* — Umar Cheema
*Assistant Examiner* — Anh Nguyen
(74) *Attorney, Agent, or Firm* — Alexa L. Ashworth; A. Imtiaz Billah; Arnold B. Bangali

(57) ABSTRACT

Embodiments of the present invention provide systems and methods for dynamically allocating data to multiple nodes. The method includes determining the usage of multiple buffers and the capability factors of multiple servers. Data is then allocated to multiple buffers associated with multiple active servers, based on the determined usage and capability factors, in order to keep the processing load on the multiple servers balanced.

14 Claims, 4 Drawing Sheets

(56) References Cited

OTHER PUBLICATIONS

List of IBM Patents or Patent Applications Treated As Related, Dated Feb. 9, 2016, 2 pages.

Basermann et al.; "Dynamic load-balancing of finite element applications with the DRAMA library"; Applied Mathematical Modelling 25 (2000); Received Jun. 1, 2000; Accepted Aug. 1, 2000; pp. 83-98; © 2000 Elsevier Science Inc.

Capdehourat et al.; "Minimum Queue Length Load-Balancing in Planned Wireless Mesh Networks"; 2012 International Symposium on Wireless Communication Systems (ISWCS); Aug. 28-31, 2012; pp. 781-785; © 2012 IEEE.

"EMC Powerpath Load Balancing and Failover: Comparison with native MPIO operating system solutions"; White Paper; Feb. 2011; pp. 1-28; © 2011 EMC Corporation.

\* cited by examiner

DYNAMIC LOAD BALANCING FOR DATA ALLOCATION TO SERVERS

BACKGROUND OF THE INVENTION

The present invention relates generally to the field of load balancing, and more particularly to dynamically allocating data to one or more servers of a system in order to optimally balance a processing load on each of the servers.

In data processing, in which data is distributed to many nodes (e.g., servers) to be processed, load balance techniques are often used to ensure that the loads of the respective nodes are balanced. Load balance techniques are known. For example, a 'round-robin' method in which data to be processed is allocated to the nodes in a 'round-robin' manner is often used. The 'round-robin' method allocates data equally among each of the nodes. Another load balance method uses a cross-comparison of the processing loads on each of nodes of a system. This method compares the processing loads, in order to find the node with the lowest processing load each time there is data to be allocated, and then allocating the data to the node with the lowest processing load.

SUMMARY

According to one embodiment of the present invention, a method for allocating data is provided, the method comprising: determining usage of one or more buffers associated with one or more active nodes from a plurality of nodes; determining capability factors associated with the one or more active nodes, wherein the capability factors indicate processing abilities of the one or more active nodes; and allocating data to one or more buffers associated with the one or more active nodes, based, at least in part, on the usage of the one or more buffers associated with the one or more active nodes and the capability factors associated with the one or more active nodes.

According to another embodiment of the present invention, a system for allocating data is provided, the system comprising: one or more processors; a memory coupled to at least one of the processors; a set of computer program instructions stored in the memory for execution by at least one of the one or more processors, the set of computer program instructions comprising: program instructions to determine usage of one or more buffers associated with one or more active nodes from a plurality of nodes; program instructions to determine capability factors associated with the one or more active nodes, wherein the capability factors indicate processing abilities of the one or more active nodes; and program instructions to allocate data to one or more buffers associated with the one or more active nodes, based, at least in part, on the usage of the one or more buffers associated with the one or more active nodes and the capability factors associated with the one or more active nodes.

According to yet another embodiment of the present invention, a computer program product for allocating data is provided, the computer program product comprising: a computer readable storage medium and program instructions stored on the computer readable storage medium, the program instructions comprising: program instructions to determine usage of one or more buffers associated with one or more active nodes from a plurality of nodes; program instructions to determine capability factors associated with the one or more active nodes, wherein the capability factors indicate processing abilities of the one or more active nodes; and program instructions to allocate data to one or more buffers associated with the one or more active nodes, based, at least in part, on the usage of the one or more buffers associated with the one or more active nodes and the capability factors associated with the one or more active nodes.

DETAILED DESCRIPTION

Embodiments of the present invention provide systems and methods for dynamically determining an optimal processing load on a set of servers, taking into account a utilization state of the buffers and the capability factors of the set of servers.

Figure 1:
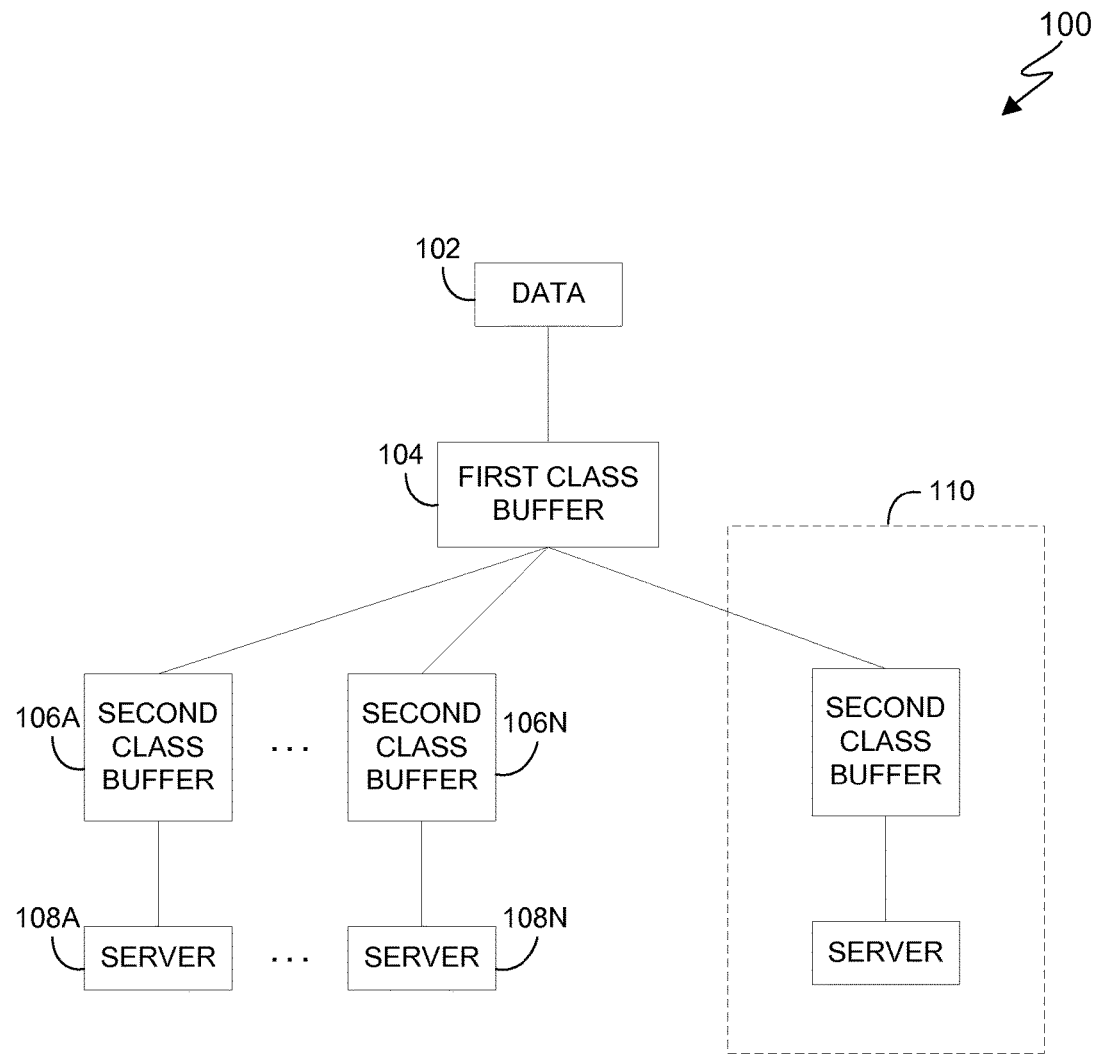
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. Modifications to data processing environment 100 may be made by those skilled in the art without departing from the scope of the invention as recited by the claims. The term 'nodes' as used herein may refer to any devices having data processing capabilities, such as personal computers or servers. Hereinafter, the embodiments of the present invention will be described by taking the servers as an example of the nodes.

In an exemplary embodiment, data processing environment 100 includes data 102, first class buffer 104, second class buffers 106A-N (assumed to be N buffers hereinafter for convenience of description, where N>1) connected to first class buffer 104, and servers 108A-N, connected to each of second class buffers 106A-N, where each of second class buffers 106A-N corresponds to each of servers 108A-N.

First class buffer 104 receives outside data 102 to be processed by the respective servers 108A-N and stores data 102. Data 102 is allocated to the respective second class buffers 106A-N (described in detail below), so as to perform load balancing among the respective buffers and servers. The respective second class buffers 106A-N store data 102 allocated thereto from the first class buffer 104, and the data 102 stored in each of second class buffers 106A-N is processed by servers 108A-N, for which the second class buffer is provided.

In this exemplary embodiment, data processing environment 100 may optionally include standby pool 110, which includes at least one server and at least one buffer provided for the at least one server. The server(s) and buffer(s) included in standby pool 110 are inactive (e.g., idle or standby) and may be activated to process data when necessary. Hereinafter, the computer-implemented method and device for allocating data to one or more nodes according to embodiments of the present invention will be described in the context of the data processing environment depicted in FIG. 1, however, it is to be understood that the method and the device may be applied in other systems.

Additionally, it is to be appreciated that the terms "first class" and "second class" as used herein are only used to differentiate between the buffer for receiving outside data and the buffers provided for the respective servers, and are not intended to limit these buffers to a particular class relation. Therefore, the terms "first class" and "second class" may be omitted or interchanged if desired without affecting the implementation of the present disclosure. Additionally, it is to be noted that although only one first class buffer is depicted in FIG. 1, this is exemplary, and in other embodiments, there may be two or more first class buffers. In such a case, the respective second class buffers may be connected to one or more of the first class buffers, and the first class buffers may cooperate with each other to send data to the respective second class buffers. For example, the first class buffers may supply data to the respective second class buffers in turn, or in other manners as needed.

In this exemplary embodiment, two factors (i.e., utilization states of the second class buffers associated with the respective servers and processing capabilities of the respective servers), may be taken into account when load balance is performed among servers 108A-N (i.e., among the second class buffers associated with the respective servers).

A utilization state of a second class buffer for a server reflects a processing load on the second class buffer. In an embodiment of the present invention, the utilization state of the second class buffer may be expressed by a utilization ratio of the second class buffer. If the utilization ratio of the second class buffer is high enough, for example, is greater than a first ratio threshold, the second class buffer may be regarded as being full, which means that the load of the second class buffer is in a high state. The first ratio threshold may be a relatively large value, such as 90%, 95%, 100%, or any other value determined according to determined resource requirements. If the utilization ratio of the second class buffer is lower than a second ratio threshold, the second class buffer may be regarded as being empty, which means that the load of the second class buffer is in a low state. The second ratio threshold may be a relatively small value, which is smaller than the first ratio threshold, such as 10%, 5%, 0%, or any other value determined according to the resource requirements of the system. Accordingly, if the utilization ratio of the second class buffer is not greater than the first ratio threshold, and not lower than the second ratio threshold, then the second class buffer may be regarded as being not full and not empty, which means that the load of the second class buffer is in an intermediate state. In another embodiment, the utilization state of the second class buffer may be expressed by a utilization amount of the second class buffer, in which case the load of the second class buffer may be similarly determined through comparisons against a first amount threshold, which is relatively large, and a second amount threshold which is relatively small. Hereinafter, the utilization ratio or the utilization amount of the second class buffer may be determined by a method known in the art, and a detailed description thereof is omitted for simplicity. Hereinafter, the embodiments of the present invention will be described by taking the utilization ratio as an example of the utilization state.

A processing capability of a server refers to a capability of the server for processing various data. Specifically, in the distributed system, different servers may be configured with different resources to achieve configuration flexibility of the system, and thus may have different data processing capabilities. The resources may include one or more of, for example, central processing unit (CPU) resources, memory resources, I/O resources, and other types of resources known in the art. Often, a server configured with more resources may have a stronger processing capability than a server configured with less resources, and thus may process data more quickly than the server configured with less resources. However, it is difficult to determine the data processing capability of the server quantitatively based on the resources of the server. In this exemplary embodiment, a capability factor is introduced to indicate the processing capability of the server numerically. Specifically, the capability factor of the server may be determined according to the resources of the server. In this embodiment, a larger value may be assigned to a capability factor of a server configured with more resources, and a smaller value may be assigned to a capability factor of a server configured with less resources. For example, a first server configured with 16 CPUs may have a stronger processing capability than a second server configured with 4 CPUs, and thus may have a larger capability factor than the second server. A range of the values of the capability factors of the respective servers may be any range determined according to the system resource requirements. For example, the values of the capability factors may range from 1 to 10 or from 0 to 1. It is to be appreciated that the relation between the value of the capability and the resources described above is only exemplary, and other relations are also possible. For example, in another embodiment, it is possible for a server having a stronger processing capability to be assigned a smaller capability factor, in which case the method and devices are still applicable after an adaptive change is made.

In this exemplary embodiment, initial values may be estimated and assigned to capability factors of the respective servers according to the resources of the servers. For example, the initial values may be estimated empirically according to the resources of the servers. After the method or the device, according to the embodiments of the present disclosure, has been used to allocate data to the servers based on the initial values of the capability factors, the capability factors of the respective servers may be further adjusted, if necessary, according to utilization states of the second class buffers associated with the respective servers, as described in further detail below. The capability factors of the respective servers may be stored in, for example, memory, for use in subsequent operations.

Additionally, in this exemplary embodiment, the data stored in the first class buffer may be initially allocated to the respective second class buffers in a round-robin manner, or in any other manner known in the art. When the loads of the respective servers are determined to be unbalanced (or at any time according to system resource requirements), the data stored in first class buffer 104 may instead be allocated to the respective second class buffers 106A-N using the methods described in embodiments of the present invention. Determination of the unbalanced loads of the respective servers may be performed in various manners known in the art. As an example, if a deviation of a utilization ratio of a second class buffer from an average of utilization ratios of all of the second class buffers is larger than a predetermined threshold, the load of the second class buffer may be considered to be too heavy, and thus the loads of the second class buffers are not balanced (depicted in FIG. 3).

Figure 2:
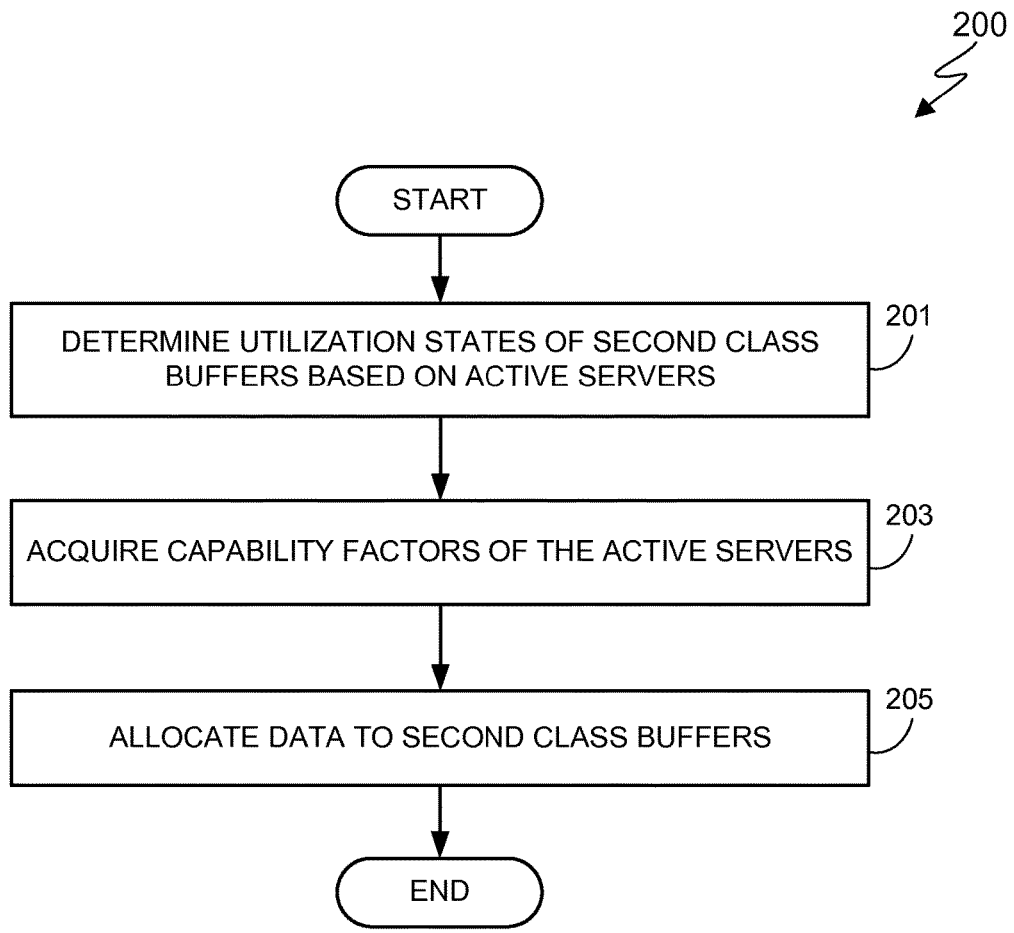
FIG. 2 depicts a flowchart illustrating operational steps for allocating data to one or more servers, in accordance with an embodiment of the present invention.

FIG. 2 depicts flowchart 200 illustrating operational steps for allocating data to one or more servers, in accordance with an embodiment of the present invention.

In step 201, the utilization states of second class buffers, based on the respective active servers, are determined. Specifically, the active servers from servers 108A-N may be detected first. In an exemplary embodiment, the detection of the active servers may be determined according to information collected in advance, indicating the operating states (e.g., active states or inactive states) of the servers. In this case, the operating states of the servers may be detected in advance periodically or asynchronously, and the information may be generated accordingly and stored in memory. At the time of detection, the information may be read from the memory, so that the active servers may be identified according to the collected and stored information. In another embodiment, the detection of the active servers from servers 108A-N may be performed in near real-time, instead of being performed based on the information collected in advance.

In other embodiments, if an inactive server is detected from servers 108A-N, the inactive server may be recycled, i.e., may be marked as inactive and will not be used to process data. A message or alarm may also be provided to a user/administrator of the system to show that the server is inactive. In another embodiment, data stored in one of second class buffers 106A-N associated with the detected inactive server, if any, may be retrieved by first class buffer 104, so that the data may be allocated to other second class buffers 106A-N. In this way, the inactive server is excluded from data allocation, and data which has been allocated to it may be retrieved, thus reducing improper data allocation and improving data processing efficiency.

In this exemplary embodiment, when the active servers have been detected, a number of the active servers may be counted to see whether there are too few active servers which are processing data. For example, it may be determined whether the number of active servers is less than a predetermined threshold, which may specify an acceptable least number of active servers. If there are too few active servers which are processing data, at least one server from standby pool 110 may be activated to process the data. In this way, a new server(s) may be activated if there are too few active servers so that there are always enough active servers to process the data, thereby avoiding the processing load of any one active server from becoming too heavy.

After the active servers have been detected, the utilization states of the second class buffers associated with the respective active servers may be determined. As described above, the utilization states of the respective second class buffers may be expressed by utilization ratios of the respective second class buffers. A method for determining the utilization ratios of the second class buffers is known in the art, thus a detailed description thereof is omitted here.

In some embodiments, the number of the active servers can be adjusted according to the utilization states of the second class buffers associated with the respective active servers, so that there are a suitable number of active servers which are processing the data. For example, if the processing loads on most of the active servers is high, the number of active servers may be increased, so that there are more active servers to process the data. It may be determined whether the processing loads on most of the active servers are high using various methods. For example, one method detects that a proportion of the active servers have a certain first buffer utilization ratio, and if the proportion of active servers having the certain first buffer utilization ratio is larger than a first proportion threshold, the number of active servers may be increased by activating at least one inactive server (and the associated second class buffer) in standby pool 110. The first buffer utilization ratio is a state when a utilization ratio of a buffer associated with an active server is larger than the first ratio threshold, which means the active server has a high processing load. The first proportion threshold is a value determined according to actual processing needs, for example, 50%.

On the other hand, if the processing loads of most of the active servers are low, the number of active servers may be decreased, so that utilization efficiency of the servers may be improved. It may be determined whether the loads of most of the active servers are low using various methods. For example, one method detects that a proportion of the active servers have a certain second buffer utilization ratio, and if the proportion of active servers having the certain second buffer utilization ratio is larger than a second proportion threshold, the number of the active servers may be decreased by deactivating at least one of the active servers (and the associated second class buffer). The second buffer utilization ratio is a state when a utilization ratio of a buffer associated with an active server is smaller than the second ratio threshold. The second proportion threshold is a value determined according to actual processing needs, and may be the same as, or different from, the first proportion threshold, for example 50%. Additionally, in this case, the data stored in the second class buffer associated with the at least one deactivated server may be retrieved for re-allocation.

In step 203, capability factors of each of the active servers may be acquired. The capability factors of the active servers indicate the processing capabilities of the active servers. For example, the capability factors of the active servers may be determined in advance, and stored in the memory as described above, in which case the capability factors of the active servers may be acquired in this step by reading the stored capability information from the memory.

In step 205, data is allocated to the second class buffers associated with the active servers, according to the utilization states of the second class buffers and the capability factors of the respective active servers. In this exemplary embodiment, both the utilization states of the second class buffers (i.e., the processing loads of the second class buffers) and the processing capabilities of the associated active servers (i.e., how fast the data may be processed by the servers) may be taken into account when the data stored in first class buffer 104 is to be allocated to the respective second class buffers 106A-N.

In this exemplary embodiment, if a utilization ratio of a second class buffer is greater than the first ratio threshold (i.e., the second class buffer may be regarded as being full, as described above), data may not be allocated to this second class buffer. On the other hand, if a utilization ratio of a second class buffer is less than the first ratio threshold (i.e., the second class buffer is not full), a proportional amount of data may be allocated to the second class buffer, where a greater proportion of data may be allocated to the second class buffer if it is empty, and a smaller proportion of data may be allocated to the second class buffer if it is not empty. Specifically, the amount of data allocated to the second class buffer may be determined according to the utilization ratio of the second class buffer and the capability factor of the server associated with the second class buffer. For example, the amount of data to be allocated to the second class buffer may be determined such that the larger the utilization ratio of the second class buffer, the smaller the amount of the data, and the larger the capability factor of the server, the larger the amount of the data.

More specifically, the amount of the data allocated to the second class buffer may be determined according to the utilization ratio of the second class buffer and the capability factor of the server for which the second class buffer is provided in various manners. In this exemplary embodiment, the amount of data allocated to the second class buffer is determined using the known utilization ratio of the second class buffer value (obtained in step 201) and an pre-assigned or pre-adjusted capability factor of the server. The amount of data allocated to the second class buffer is determined by a quotient of the capability factor of the server divided by the utilization ratio of the second class buffer. In this case, the larger the value of the quotient, the larger the amount of the data may be. For example, if the utilization ratio of the second class buffer is 50% (i.e., 0.5), and the capability factor of the server is 10, the value of the quotient is 20 (i.e., capability factor of the server divided by utilization ratio of the second class buffer), thus a first amount of data may be allocated. If the utilization ratio of the second class buffer is 40% (i.e., 0.4), and the capability factor of the server is 6, the value of the quotient is 15, thus a second amount of data may be allocated, where the second amount is smaller than the first amount (i.e., the second quotient value of 15 is less than the first quotient value of 20).

In another embodiment, the amount of data allocated to the second class buffer is determined according to a difference between the capability factor of the server and the utilization ratio of the second class buffer. For example, if the utilization ratio of the second class buffer is 50% (i.e., 0.5), and the capability factor of the server is 0.2, the difference between the capability factor of the server and the utilization ratio of the second class buffer is −0.3, thus a first corresponding amount of data may be allocated. If the utilization ratio of the second class buffer is 60% (i.e., 0.6) and the capability factor of the server is 0.8, the difference between the capability factor of the server and the utilization ratio of the second class buffer is 0.2, thus a second corresponding amount of data may be allocated, where the second corresponding amount of data is larger than the first corresponding amount of data (i.e., the first difference value of −0.3 is less than the second difference value of 0.2). Specific values of the amounts of data allocated to the second class buffers may be determined according to various factors, such as a total amount of data stored in the first class buffer, storage capacities of the second class buffers, and/or design requirements.

In this way, the data stored in the first class buffer may be allocated to the respective second class buffers. As the allocation of data is performed according to the utilization states of the respective second class buffers and the processing capabilities of the servers associated with the second class buffers (i.e., how fast the data stored in the second class buffers can be processed by the servers), the amounts of data allocated to the respective second class buffers may be determined so that too many or too few processing loads will not be placed on the respective second class buffers, and thus a balance of the processing loads on the buffers may be obtained. Additionally, as the utilization states of the associated second class buffers may be detected quickly, and the capability factors representing the processing capabilities of the servers may be determined in advance, the allocation of data to balance the processing loads may be performed more readily than a conventional method (i.e., the loads of the respective second class buffers are cross-compared to allocate the data). In this exemplary embodiment, the second class buffers associated with each server are continuously monitored, and the processing load on each server is adjusted accordingly (i.e., if some buffers are too full, then increase the processing load on some servers, and if some buffers are empty, then other processing loads are released to the servers associated with the empty buffers).

Data allocated to each second class buffer may be further allocated to a server associated with the second class buffer, so as to be processed. In one embodiment, an amount of data allocated from each second class buffer to the associated server may be predetermined according to determined needs. For example, the amount of predetermined data may be 8 bits, so that 8 bits of data are allocated to the associated server each time the allocation is performed. In this case, the allocation may be performed periodically, asynchronously, or when a particular event occurs (e.g., detecting that the load on the server is low), and the server receives the allocated data passively and processes the data. In another embodiment, the amount of data allocated from each second class buffer to the associated server may be determined according to a request from the server. Specifically, the amount of data to be allocated may be determined by, for example, the server, according to available resources of the server, and then the server may send a request for the amount of data to the second class buffer actively, so that the requested amount of data is allocated to the server. More specifically, although the server is configured with various resources, only some of the resources may be used to process the data, and from the resources used to process the data, only the idle resources may be determined to be available resources of the server. Therefore, the amount of data which may be processed by the available resources of the server may be determined to be the amount of data to be allocated to the server. For example, assuming that the resources are CPU resources and only 80% of the total CPU resources may be used to process data, where 20% of the total CPU resources have been occupied, then the idle (i.e., available) CPU resources are 60% (i.e., 80%-20%) of the total CPU resources. Therefore, the amount of data which may be processed through the 60% of the total CPU resources of the server is the amount of data to be allocated to the server. In this way, the server may actively request the amount of data it is capable of accommodating, thereby avoiding too much or too little data allocated to the server, thus preventing the server from becoming overburdened or underutilized.

In this exemplary embodiment, data may be allocated to the second class buffers according to the utilization states of the second class buffers and the capability factors of the respective active servers, where the capability factors of the respective servers are assigned initial values according to the resources of the servers (as described above). However, the initial values of the capability factors of the respective servers may not be optimized, so that the determined amounts of data may not be optimal. In view of this, the capability factors of the respective servers may be adjusted according to the utilization states of the second class buffers for the associated servers, which represent the loads of the second class buffers, when necessary. For example, if a processing load on a second class buffer is low during a certain period of time, this shows that the amount of data allocated to this second class buffer previously is too small, thus a capability factor of the server associated with the second class buffer may be increased, so that more data may be allocated to this second class buffer in the future. Conversely, if the processing load on the second class buffer is high during a certain period of time, this shows that the amount of data allocated to this second class buffer previously is too large, thus the capability factor of the server associated with the second class buffer may be decreased, so that less data may be allocated to this second class buffer in the future. If a processing load on the second class buffer is in an intermediate state during a certain period of time, this shows that the amount of data allocated to this second class buffer previously is suitable, thus the capability factor of the server associated with the second class buffer may remain unchanged, or be adjusted slightly, according to determined resource requirements. The processing load on the second class buffer during a certain period of time may be characterized by the average utilization ratio of the second class buffer during the period of time. If the average utilization ratio is larger than a first average threshold, the processing load on the second class buffer may be considered high. If the average utilization ratio is smaller than a second average threshold, the load on the second class buffer may be considered low. If the average is not greater than the first average threshold and is not lower than the second average threshold, then the load on the second class buffer may be considered suitable. The first average threshold and the second average threshold may be determined according to resource requirements. For example, the first average threshold may be a relatively large value, e.g., 85%, and the second average threshold may be a relatively small value, e.g., 15%. Additionally, it is to be appreciated that other factors may be used to determine whether the processing loads on the respective servers are high, low, or suitable, and thus determine whether the capability factors of the servers need to be adjusted. The adjustment may be performed periodically, asynchronously, or when a particular event occurs (e.g., detecting that the load on the server is low). In this way, the capability factors of the servers may be more suitable for the servers and the amount of data allocated to the respective servers each time the allocation is performed may be more suitable, so that the processing loads of each respective server are more easily balanced.

Figure 3:
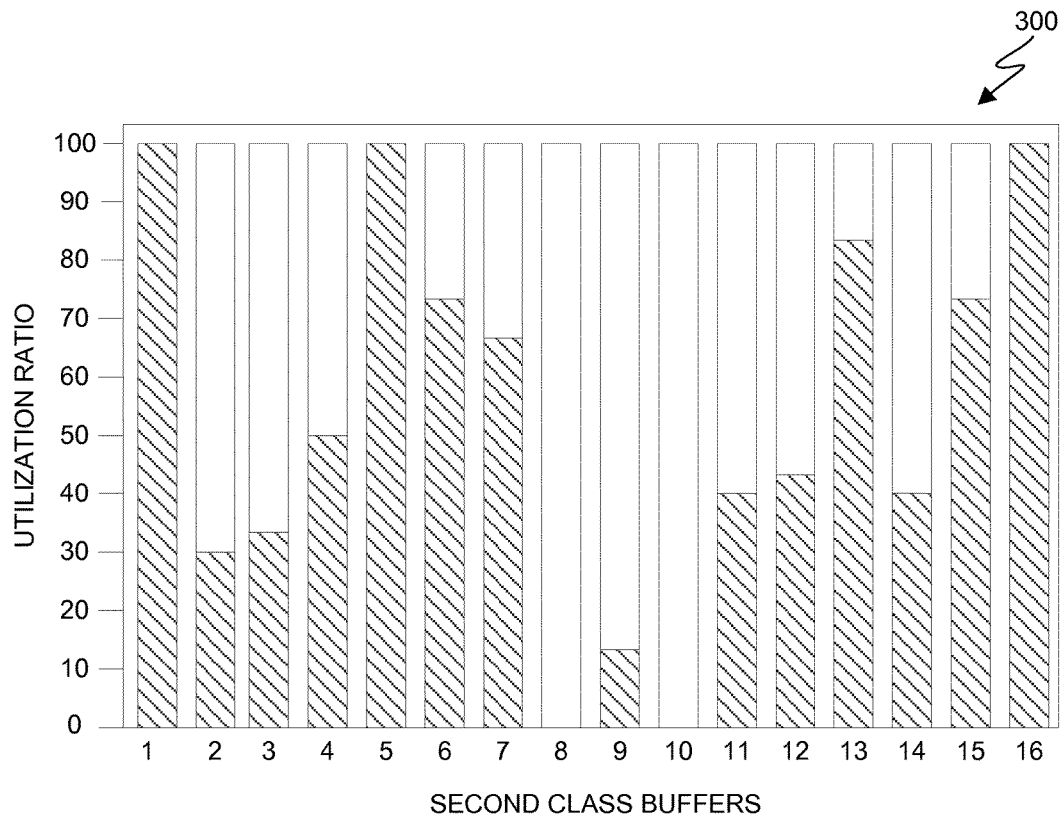
FIG. 3 depicts an example graph illustrating an unbalance between the processing loads on second class buffers, in accordance with an embodiment of the present invention.

FIG. 3 depicts an example graph 300 illustrating an unbalance between the processing loads on a set of second class buffers, in accordance with an embodiment of the present invention FIG. 3 depicts an example of the utilization ratio (i.e., marked 0 through 100 on the vertical axis) of 16 different second class buffers (i.e., marked 1 through 16 on the horizontal axis). In the example of FIG. 3, second class buffers 1, 5, and 16 are full (i.e., utilization ratio is 100), which means that too much data has been allocated to these second class buffers, and it may take longer to process the additional data. On the other hand, second class buffers 8 and 10 are empty (i.e., utilization ratio is 0), which means too little data has been allocated to these second class buffers and these second class buffers may have additional unused processing capacity.

Figure 4:
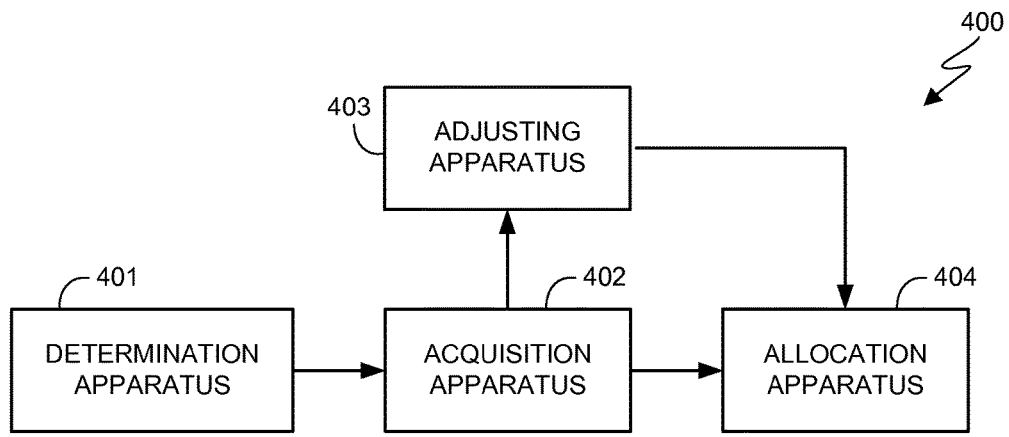
FIG. 4 depicts a block diagram of a system for allocating data to one or more servers, in accordance with an embodiment of the present invention.

FIG. 4 depicts a block diagram of system 400 for allocating data to one or more servers, in accordance with an embodiment of the present invention.

As shown in FIG. 4, device 400 for allocating data to one or more servers includes determination apparatus 401, acquisition apparatus 402, adjusting apparatus 403, and allocation apparatus 404. It is to be appreciated that adjusting apparatus 403 may be omitted in some embodiments.

Determination apparatus 401 may determine utilization states of second class buffers for the respective active servers from the one or more servers, by detecting the active servers, detecting the inactive servers, and/or identifying whether there are too few active servers from a predetermined threshold, as described in detail above (step 201 of FIG. 2). As described above, the utilization states of the respective second class buffers may be expressed by utilization ratios of the respective second class buffers.

Acquisition apparatus 402 may acquire capability factors of the active servers. For example, the capability factors of the respective active servers may be determined in advance and stored in the memory, in which case acquisition apparatus 402 may acquire the capability factors by reading the information from the memory, as described above (step 203 of FIG. 2).

Adjusting apparatus 403 may optionally adjust the number of the active servers according to the utilization states of the second class buffers associated with the respective active servers, so that there is a suitable number of active servers processing the data, as described in detail above (step 201 of FIG. 2). Specifically, if the processing loads on the active servers are high, adjusting apparatus 403 may increase the number of active servers by activating at least one inactive server (and the associated second class buffer) in standby pool 110. On the other hand, if the processing loads of the active servers are low, adjusting apparatus 403 may decrease the number of active servers by deactivating at least one of the active servers (and the associated second class buffer). Additionally, allocation apparatus 404 (described below) may retrieve data stored in the second class buffer associated with the al least one deactivated server for re-allocation.

Allocation apparatus 404 may allocate data to the second class buffers associated with the respective active servers, according to the utilization states of the second class buffers and the capability factors of the respective active servers, as described in detail above (step 205 of FIG. 2). Specifically, allocation apparatus 404 may not allocate data to a second class buffer if the second class buffer is full, and, conversely, allocation apparatus 404 may allocate a proportional amount of data to the second class buffer if the second class buffer is not full. Allocation apparatus 404 may further allocate the data allocated to each second class buffer to an associated server for which the second class buffer is provided, so as to be processed (in the same manner as described above in step 205 of FIG. 2).

Adjusting apparatus 403 may adjust the capability factors (increase or decrease) of the respective servers according to the utilization states of the second class buffers provided for the respective servers, if necessary, as described in detail above (step 205 of FIG. 2).

Figure 5:
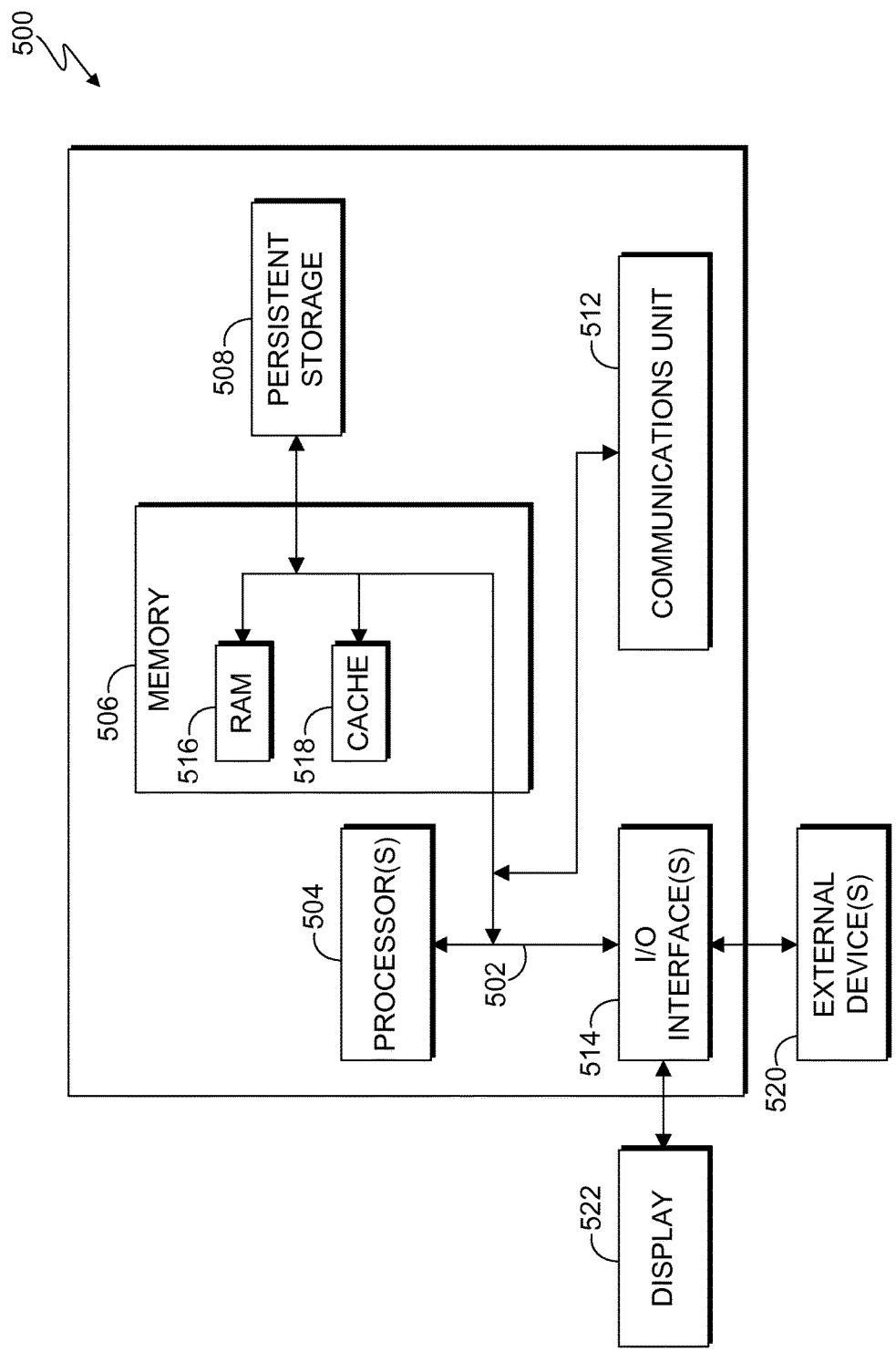
FIG. 5 is a block diagram of internal and external components of a computing device, in accordance with an embodiment of the present invention.

FIG. 5 is a block diagram of internal and external components of computing device 500, which is representative of the computing devices of FIG. 1 and FIG. 4, in accordance with an illustrative embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computing device 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computing device 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
one or more processors;
a memory coupled to at least one of the processors;
one or more computer readable storage media;
one or more buffers associated with a respective stand-by pool, wherein the respective stand-by pool includes one or more buffers associated with one or more active nodes of a plurality of nodes, wherein:
the one or more buffers associated with the respective stand-by pool are a first-type of plurality of buffers,
the one or more buffers associated with the one or more active nodes of the plurality of nodes are a second-type of plurality of buffers, and
the first-type of plurality of buffers are different from the second-type of plurality of buffers;
a set of computer program instructions stored in the computer readable storage media memory for execution by at least one of the one or more processors, the set of computer program instructions comprising:
program instructions to determine usage of the one or more buffers associated with one or more active nodes from the plurality of nodes;
program instructions to detect operating states of each node of the plurality of nodes;
program instructions to determine capability factors associated with the one or more active nodes, wherein the capability factors indicate processing abilities of the one or more active nodes, wherein the capability factors of the one or more active nodes are determined based on allocation of a plurality of resources of the one or more active nodes, wherein the capability factors of the one or more actives nodes are determined in advance based on the operating state of each node of the active nodes, wherein the determined capability factors are stored in memory for future retrieval, wherein a larger value is assigned to at least one capability factor of the one or more active nodes configured with more resources, and wherein a smaller value is assigned to at least one capability factor of the one or more active nodes configured with less resources;
program instructions to allocate data to the one or more buffers associated with the one or more active nodes, based, at least in part, on the usage of the one or more buffers associated with the one or more active nodes and the capability factors associated with the one or more active nodes;
program instructions to detect one or more inactive nodes from the plurality of nodes in real-time and after collecting information pertaining to the capability factors associated with the one or more active nodes;
in response to detecting the one or more inactive nodes based on the usage of the one or more buffers associated with the one or more active nodes and the capability factors associated with the one or more active nodes, program instructions to allocate the data from the one or more inactive nodes to the one or more active nodes;
program instructions to exclude one or more inactive nodes of a plurality of nodes;

program instructions to process the data in the excluded one or more inactive nodes at a later time to reduce improper data allocation errors;
program instructions to determine a processing load for the plurality of nodes; and
program instruction to adjust the capability factors according to the second-type of buffers by:
using an increased number of the one or more active nodes from the plurality of nodes in response to determining the processing load is high, and
using a decreased number of the one or more active nodes from the plurality of nodes in response to determining the processing load is low.

2. The computer system of claim 1, further comprising:
in response to determining that a usage ratio of a buffer from the one or more buffers associated with the one or more active nodes is greater than a first threshold, program instructions to allocate no data to the buffer from the one or more buffers associated with the one or more active nodes.

3. The computer system of claim 1, further comprising:
in response to determining that a usage ratio of a buffer from the one or more buffers associated with the one or more active nodes is less than a first threshold, program instructions to allocate a portion of data to the buffer from the one or more buffers associated with the one or more active nodes, wherein the portion of the data is based, at least in part, on the usage of the one or more buffers associated with the one or more active nodes and the capability factors associated with the one or more active nodes.

4. The computer system of claim 3, further comprising:
program instructions to associate a larger usage value of the one or more buffers associated with the one or more active nodes, is associated with a smaller value of the portion of the data; and
program instructions to associate a larger capability factors value with a larger value of the portion of the data.

5. The computer system of claim 4, further comprising:
program instructions to adjust a number of the one or more active nodes according to the usage of the one or more buffers associated with the one or more active nodes.

6. The computer system of claim 3, further comprising:
program instructions to allocate the portion of data to at least one of the one or more active nodes, wherein the portion of the data is determined, at least in part, from available resources of the at least one of the one or more active nodes.

7. The computer system of claim 1, further comprising:
program instructions to adjust the capability factors associated with the one or more active nodes according to a usage of the one or more buffers associated with the one or more active nodes.

8. A computer program product comprising:
one or more buffers associated with a respective stand-by pool, wherein the respective stand-by pool includes one or more buffers associated with one or more active nodes of a plurality of nodes, wherein:
the one or more buffers associated with the respective stand-by pool are a first-type of plurality of buffers,
the one or more buffers associated with the one or more active nodes of the plurality of nodes are a second-type of plurality of buffers, and
the first-type of plurality of buffers are different from the second-type of plurality of buffers;
a set of computer program instructions stored in the computer readable storage media memory for execution by at least one of the one or more processors, the set of computer program instructions comprising:
program instructions to determine usage of the one or more buffers associated with one or more active nodes from the plurality of nodes;
program instructions to detect operating states of each node of the plurality of nodes;
program instructions to determine capability factors associated with the one or more active nodes, wherein the capability factors indicate processing abilities of the one or more active nodes, wherein the capability factors of the one or more active nodes are determined based on allocation of a plurality of resources of the one or more active nodes, wherein the capability factors of the one or more actives nodes are determined in advance based on the operating state of each node of the active nodes, wherein the determined capability factors are stored in memory for future retrieval, wherein a larger value is assigned to at least one capability factor of the one or more active nodes configured with more resources, and wherein a smaller value is assigned to at least one capability factor of the one or more active nodes configured with less resources;
program instructions to allocate data to the one or more buffers associated with the one or more active nodes, based, at least in part, on the usage of the one or more buffers associated with the one or more active nodes and the capability factors associated with the one or more active nodes;
program instructions to detect one or more inactive nodes from the plurality of nodes in real-time and after collecting information pertaining to the capability factors associated with the one or more active nodes;
in response to detecting the one or more inactive nodes based on the usage of the one or more buffers associated with the one or more active nodes and the capability factors associated with the one or more active nodes, program instructions to allocate the data from the one or more inactive nodes to the one or more active nodes;
program instructions to exclude one or more inactive nodes of a plurality of nodes;
program instructions to process the data in the excluded one or more inactive nodes at a later time to reduce improper data allocation errors;
program instructions to determine a processing load for the plurality of nodes; and
program instruction to adjust the capability factors according to the second-type of buffers by:
using an increased number of the one or more active nodes from the plurality of nodes in response to determining the processing load is high, and
using a decreased number of the one or more active nodes from the plurality of nodes in response to determining the processing load is low.

9. The computer program product of claim 8, further comprising:
in response to determining that a usage ratio of a buffer from the one or more buffers associated with the one or more active nodes is greater than a first threshold, program instructions to allocate no data to the buffer from the one or more buffers associated with the one or more active nodes.

10. The computer program product of claim 8, further comprising:
   in response to determining that a usage ratio of a buffer from the one or more buffers associated with the one or more active nodes is less than a first threshold, program instructions to allocate a portion of data to the buffer from the one or more buffers associated with the one or more active nodes, wherein the portion of the data is based, at least in part, on the usage of the one or more buffers associated with the one or more active nodes and the capability factors associated with the one or more active nodes.

11. The computer program product of claim 10, further comprising:
   program instructions to associate a larger usage value of the one or more buffers associated with the one or more active nodes, is associated with a smaller value of the portion of the data; and
   program instructions to associate a larger capability factors value with a larger value of the portion of the data.

12. The computer program product of claim 11, further comprising:
   program instructions to adjust a number of the one or more active nodes according to the usage of the one or more buffers associated with the one or more active nodes.

13. The computer program product of claim 10, further comprising:
   program instructions to allocate the portion of data to at least one of the one or more active nodes, wherein the portion of the data is determined, at least in part, from available resources of the at least one of the one or more active nodes.

14. The computer program product of claim 8, further comprising:
   program instructions to adjust the capability factors associated with the one or more active nodes according to a usage of the one or more buffers associated with the one or more active nodes.

* * * * *